US011524649B2

(12) United States Patent
Ohno et al.

(10) Patent No.: US 11,524,649 B2
(45) Date of Patent: Dec. 13, 2022

(54) VEHICLE SEAT

(71) Applicants: Toyota Jidosha Kabushiki Kaisha, Toyota (JP); Toyota Boshoku Kabushiki Kaisha, Kariya (JP); Toyoda Gosei Co., Ltd., Kiyosu (JP)

(72) Inventors: Mitsuyoshi Ohno, Miyoshi (JP); Hiroyuki Tomita, Aichi-ken (JP); Satoshi Nonoyama, Toyota (JP); Takashi Iida, Kiyosu (JP); Shigemi Mase, Kiyosu (JP); Yusuke Kojima, Kiyosu (JP); Masashi Hotta, Kiyosu (JP)

(73) Assignees: TOYOTA JIDOSHA KABUSHIKI KAISHA, Toyota (JP); TOYOTA BOSHOKU KABUSHIKI KAISHA, Kariya (JP); TOYODA GOSEI CO., LTD., Kiyosu (JP)

( * ) Notice: Subject to any disclaimer, the term of this patent is extended or adjusted under 35 U.S.C. 154(b) by 0 days.

(21) Appl. No.: 17/320,697

(22) Filed: May 14, 2021

(65) Prior Publication Data

US 2021/0387589 A1    Dec. 16, 2021

(30) Foreign Application Priority Data

Jun. 12, 2020    (JP) .............................. JP2020-102662

(51) Int. Cl.
*B60R 21/207*    (2006.01)
*B60R 21/217*    (2011.01)
*B60N 2/68*    (2006.01)

(52) U.S. Cl.
CPC .......... *B60R 21/207* (2013.01); *B60R 21/217* (2013.01); *B60N 2/68* (2013.01)

(58) Field of Classification Search
None
See application file for complete search history.

(56) References Cited

U.S. PATENT DOCUMENTS

| 8,573,633 | B2 * | 11/2013 | Kino | ...................... B60R 21/233 |
| | | | | 280/728.2 |
| 8,888,126 | B2 * | 11/2014 | Nukaya | .............. B60N 2/42763 |
| | | | | 280/743.2 |
| 9,238,422 | B2 * | 1/2016 | Yamada | ................... B60N 2/07 |
| 10,710,540 | B2 * | 7/2020 | Fukawatase | .......... B60R 21/207 |

(Continued)

FOREIGN PATENT DOCUMENTS

| CN | 113492790 A | * 10/2021 | ........... B60N 2/5883 |
| JP | 2007331445 A | * 12/2007 | ............... B60N 2/42 |

(Continued)

*Primary Examiner* — Faye M Fleming
(74) *Attorney, Agent, or Firm* — Dinsmore & Shohl LLP

(57) ABSTRACT

A vehicle seat includes: a seat cushion in which a front panel extends between front parts of right and left side frames and a front rod extends between the front parts of the right and left side frames at a position rearward of the front panel in a longitudinal direction of a vehicle; a cushion airbag device mounted in a front part of the seat cushion and configured to inflate and deploy a cushion airbag when a frontal collision of the vehicle occurs; and a bag support fixed to the front rod, the cushion airbag being fixed to the bag support at a position rearward of the front rod in the longitudinal direction of the vehicle.

13 Claims, 15 Drawing Sheets

(56) References Cited

U.S. PATENT DOCUMENTS

| | | | |
|---|---|---|---|
| 2007/0205587 A1 | 9/2007 | Yoshikawa et al. | |
| 2008/0001446 A1* | 1/2008 | Suzuki | B60R 21/207 |
| | | | 297/216.1 |
| 2019/0106029 A1 | 4/2019 | Komura et al. | |
| 2019/0337427 A1* | 11/2019 | Thomas | B60N 2/427 |
| 2020/0391686 A1* | 12/2020 | Ohno | B60N 2/62 |

FOREIGN PATENT DOCUMENTS

| | | | | |
|---|---|---|---|---|
| JP | 2008-007036 A | | 1/2008 | |
| JP | 2011-156907 A | | 8/2011 | |
| JP | 2019-064553 A | | 4/2019 | |
| JP | 2020-199979 A | | 12/2020 | |
| KR | 100196173 B1 * | | 6/1999 | ......... B60R 21/2071 |
| WO | 2004/030980 A1 | | 4/2004 | |

\* cited by examiner

VEHICLE SEAT

CROSS-REFERENCE TO RELATED APPLICATION

This application claims priority to Japanese Patent Application No. 2020-102662 filed on Jun. 12, 2020, incorporated herein by reference in its entirety.

BACKGROUND

1. Technical Field

The disclosure relates to vehicle seats with a cushion airbag device mounted in a seat cushion.

2. Description of Related Art

In an occupant protection device described in Japanese Unexamined Patent Application Publication No. 2008-007036 (JP 2008-007036 A), a frame of a seat portion (seat cushion) of a vehicle seat includes a pair of right and left support frames (side frames). A front rod extends between the front parts of the right and left side frames. A seat pan (front panel) extends between the right and left side frames at a position forward of the front rod in the longitudinal direction of a vehicle. A storage recess is provided in the front panel, and an airbag device is placed in the storage recess. The airbag device inflates and deploys an airbag in case of a frontal collision of the vehicle to raise the seat surface of the seat cushion. Submarining, which is a phenomenon in which the waist of an occupant slips beneath a lap belt of a seat belt, is thus reduced. Japanese Unexamined Patent Application Publication No. 2019-064553 (JP 2019-064553 A) also discloses a similar technique.

SUMMARY

In the above related art, the airbag device is placed in the storage recess of the front panel located forward of the front rod in the longitudinal direction of the vehicle. The inflated and deployed position of the airbag of the airbag device, that is, the raised position of the seat surface of the seat cushion, is located away from the pelvis of the occupant in the forward direction of the vehicle. The airbag therefore restrains the pelvis of the occupant with a small force in the initial stage of a frontal collision before the pelvis moves toward the front of the vehicle due to inertia by the impact of the frontal collision. Moreover, only the lower end of the airbag that is inflated and deployed upward in the vertical direction of the vehicle from the storage recess of the front panel is supported by the front panel. Accordingly, when a load is applied from the pelvis moving toward the front of the vehicle due to inertia to the airbag, the airbag falls toward the front of the vehicle. In view of the above, there is room for improvement in terms of reducing submarining more effectively.

The disclosure provides a vehicle seat that reduces submarining more effectively.

A vehicle seat according to an aspect of the disclosure includes: a seat cushion in which a front panel extends between front parts of right and left side frames and a front rod extends between the front parts of the right and left side frames at a position rearward of the front panel in a longitudinal direction of a vehicle; a cushion airbag device mounted in a front part of the seat cushion and configured to inflate and deploy a cushion airbag when a frontal collision of the vehicle occurs; and a bag support fixed to the front rod, the cushion airbag being fixed to the bag support at a position rearward of the front rod in the longitudinal direction of the vehicle.

According to the above aspect, the front panel extends between the front parts of the right and left side frames of the seat cushion. The front rod extends between the front parts of the right and left side frames at a position rearward of the front panel in the longitudinal direction of the vehicle. The bag support is fixed to the front rod. The cushion airbag device configured to inflate and deploy the cushion airbag when a frontal collision of the vehicle occurs is mounted in the front part of the seat cushion. The cushion airbag is fixed to the bag support at a position rearward of the front rod in the longitudinal direction of the vehicle. An inflated and deployed position of the cushion airbag is therefore located closer to the pelvis of an occupant as compared to the related art. Moreover, a load applied from the pelvis moving toward the front of the vehicle due to inertia to the cushion airbag is transmitted to the front rod via the bag support. The movement of the pelvis of the occupant toward the front of the vehicle is thus effectively restrained, and submarining is therefore more effectively reduced.

In the above aspect, the bag support may include a seat bracket fixed to the front rod, and an airbag bracket disposed above the seat bracket in a vertical direction of the vehicle, the cushion airbag being fixed to the airbag bracket at a position rearward of the front rod in the longitudinal direction of the vehicle. The airbag bracket and the seat bracket may be fixed to each other in a fixing portion located rearward of the front rod in the longitudinal direction of the vehicle.

According to the above configuration, the seat bracket is fixed to the front rod. The airbag bracket is disposed above the seat bracket in the vertical direction of the vehicle, and the cushion airbag is fixed to the airbag bracket at a position rearward of the front rod in the longitudinal direction of the vehicle. The airbag bracket and the seat bracket are fixed to each other in the fixing portion located rearward of the front rod in the longitudinal direction of the vehicle. The cushion airbag is thus strongly supported by the front rod at a position rearward of the front rod in the longitudinal direction of the vehicle.

In the above aspect, in the fixing portion, a stopper portion provided on the airbag bracket may be retained by a retaining portion provided in the seat bracket.

According to the above configuration, the stopper portion provided on the airbag bracket is retained by the retaining portion provided in the seat bracket at a position rearward of the front rod in the longitudinal direction of the vehicle. The airbag bracket and the seat bracket are thus fixed to each other. This retaining and fixing structure facilitates fixing work.

In the above aspect, the stopper portion may be configured to be retained by the retaining portion by sliding the stopper portion toward a front of the vehicle into the retaining portion.

According to the above configuration, the stopper portion provided on the airbag bracket is retained by the retaining portion provided in the seat bracket by sliding the stopper portion toward the front of the vehicle into the retaining portion. For example, this configuration is suitable when it is difficult to secure a space for sliding in a lateral direction of the vehicle.

In the above aspect, the stopper portion may be configured to be retained by the retaining portion by sliding the stopper portion into the retaining portion in the lateral direction of the vehicle.

According to the above configuration, the stopper portion provided on the airbag bracket is retained by the retaining portion provided in the seat bracket by sliding the stopper portion in the lateral direction of the vehicle into the retaining portion. For example, this configuration is suitable when it is difficult to secure a space for sliding in the longitudinal direction of the vehicle.

In the above aspect, the seat bracket may be welded to the front rod.

According to the above configuration, the seat bracket is welded to the front rod when, e.g., a frame of the seat cushion is manufactured. This configuration facilitates the work of fixing the airbag bracket to the seat bracket when mounting the cushion airbag device in the seat cushion.

In the above aspect, the airbag bracket and the seat bracket may be fixed to each other in a front fixing portion located forward of the front rod in the longitudinal direction of the vehicle.

According to the above configuration, the airbag bracket and the seat bracket are fixed to each other both in the fixing portion located rearward of the front rod in the longitudinal direction of the vehicle and in the front fixing portion located forward of the front rod in the longitudinal direction of the vehicle. With this configuration, an excessive load applied from the pelvis of the occupant to the cushion airbag is satisfactorily transmitted to the front rod via each bracket.

In the above aspect, the airbag bracket and the seat bracket may be fixed to each other in a rear fixing portion located rearward of the fixing portion in the longitudinal direction of the vehicle.

According to the above configuration, the airbag bracket and the seat bracket are fixed to each other both in the fixing portion located rearward of the front rod in the longitudinal direction of the vehicle and in the rear fixing portion located rearward of the fixing portion in the longitudinal direction of the vehicle. This configuration reinforces the fixing portion against the excessive load that is applied from the pelvis of the occupant to the cushion airbag.

In the above aspect, the cushion airbag device may include an inflator placed in the cushion airbag at a position forward of the front rod in the longitudinal direction of the vehicle. In the front fixing portion, a stud bolt for the inflator may be passed through the airbag bracket and the seat bracket and screwed into a nut.

According to the above configuration, the stud bolt for the inflator of the cushion airbag device is also used to fix the airbag bracket and the seat bracket together. This configuration reduces the number of parts and the number of man-hours for the fixing work.

In the above aspect, the stopper portion may be a cutout portion in a side wall of the airbag bracket, and the retaining portion may be a protruding piece on a side wall of the seat bracket.

In the above aspect, the stopper portion may be a stopper tab in an upper wall of the airbag bracket, and the retaining portion may be a retaining hole in an upper wall of the seat bracket.

In the above aspect, in the fixing portion, a nut may be screwed on a bolt passed through the airbag bracket and the seat bracket.

In the above aspect, a clip passed through the airbag bracket and the seat bracket may be provided in the fixing portion.

According to the above aspect of the disclosure, the vehicle seat according to the disclosure more effectively reduces submarining.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
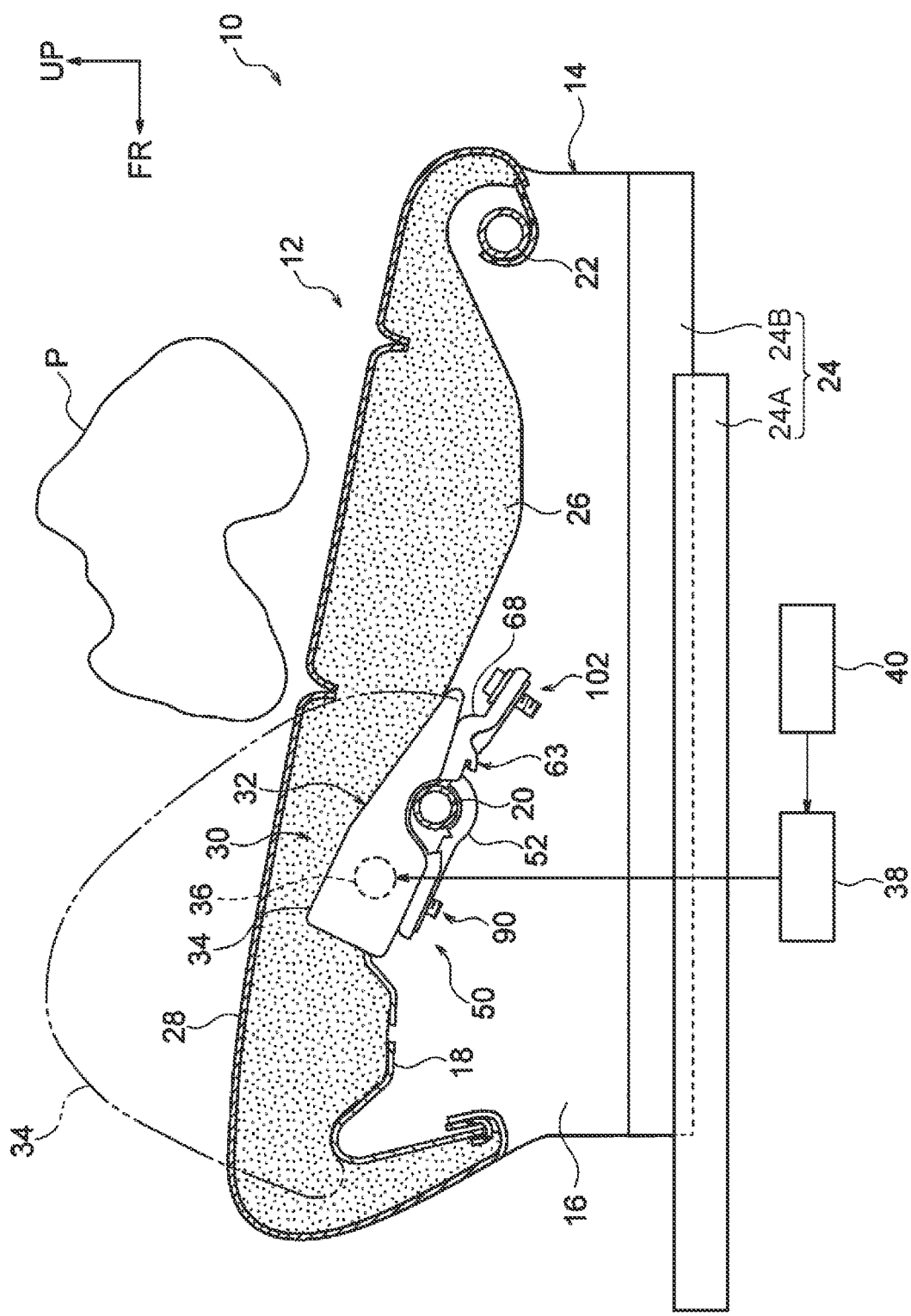
FIG. 1 is a longitudinal section of a seat cushion of a vehicle seat according to a first embodiment.

A vehicle seat 10 according to a first embodiment of the disclosure will be described with reference to FIGS. 1 to 7. In the figures, some of the signs are omitted for ease of reference. Arrows FR, LH, and UP shown as necessary in the figures indicate the forward direction, left direction, and upward direction of a vehicle on which the vehicle seat 10 is mounted. The longitudinal, lateral, and vertical directions of the vehicle seat 10 match the longitudinal, lateral, and vertical directions of the vehicle. When description is given using merely the longitudinal direction, the lateral direction, and the vertical direction, the directions indicate the directions of the vehicle unless otherwise specified.

The vehicle seat 10 according to the present embodiment includes a seat cushion 12 on which an occupant, not shown, is seated. The lower end of a seatback, not shown, that supports the occupant's back is coupled to the rear end of the seat cushion 12, and a headrest, not shown, that supports the occupant's head is coupled to the upper end of the seatback.

The seat cushion 12 includes a cushion frame 14 that is a framework, a cushion pad 26 that is a cushion material, and cushion upholstery 28 that is a covering. A cushion airbag device 30 is mounted in the front part of the seat cushion 12. The overall configuration of the seat cushion 12 will be described first, and main parts of the present embodiment will then be described.

The cushion frame 14 includes a pair of right and left side frames 16 (the left side frame is not shown in FIG. 1), a front panel 18, a front pipe frame 20, and a rear pipe frame 22. The front pipe frame 20 corresponds to the "front rod" in the disclosure.

The right and left side frames 16 are manufactured by, e.g., press-forming a steel plate. The right and left side frames 16 have an elongated plate shape that is long in the longitudinal direction and that has a thickness in the lateral direction (lateral direction of the vehicle). The right and left side frames 16 are coupled to a floor of a vehicle body, not shown, via a pair of right and left slide rails 24 (the left slide rail is not shown in FIG. 1). Each of the right and left slide rails 24 includes a lower rail 24A and an upper rail 24B. The lower rail 24A is fixed to the floor of the vehicle body, and the upper rail 24B is attached to the lower rail 24A such that the upper rail 24B can slide in the longitudinal direction with respect to the lower rail 24A. Each of the right and left side frames 16 may be coupled to the upper rail 24B via a well-known lifter mechanism.

The front panel 18 is manufactured by, e.g., press-forming a steel plate. The front panel 18 is disposed in such an attitude that a main part of the front panel 18 has a thickness substantially in the vertical direction. The front panel 18 extends between the front parts of the right and left side frames 16 and is fixed to the right and left side frames 16 by welding.

The front pipe frame 20 and the rear pipe frame 22 are made of, e.g., a steel pipe and are disposed in such an attitude that their axes extend in the lateral direction. The front pipe frame 20 is disposed at a position rearward of the front panel 18 and extends between the right and left side frames 16. The rear pipe frame 22 extends between the rear ends of the right and left side frames 16. A cushion spring, not shown, extends between the front pipe frame 20 and the rear pipe frame 22. The cushion spring is composed of, e.g., a plurality of S-shaped springs. A cushion pan may be provided instead of the cushion spring. The front pipe frame 20 is not limited to the tubular shape, and may have a solid rod shape.

A main part of the cushion pad 26 is made of a foam such as urethane foam. The cushion pad 26 is attached to the cushion frame 14 from above. The cushion pad 26 is supported from below by the front panel 18 and the cushion spring. The cushion upholstery 28 is manufactured in a bag shape by sewing a plurality of upholstery pieces together. The cushion upholstery 28 is placed on the cushion pad 26 from above. A main part of each upholstery piece is made of an upholstery material such as fabric, leather, or synthetic leather.

The cushion airbag device 30 includes a cushion airbag 34 and an inflator 36 that is a gas generator. The cushion airbag 34 has a bag shape and is made of, e.g., nylon ground fabric or polyester ground fabric. The inflator 36 is placed in the cushion airbag 34.

Figure 2:
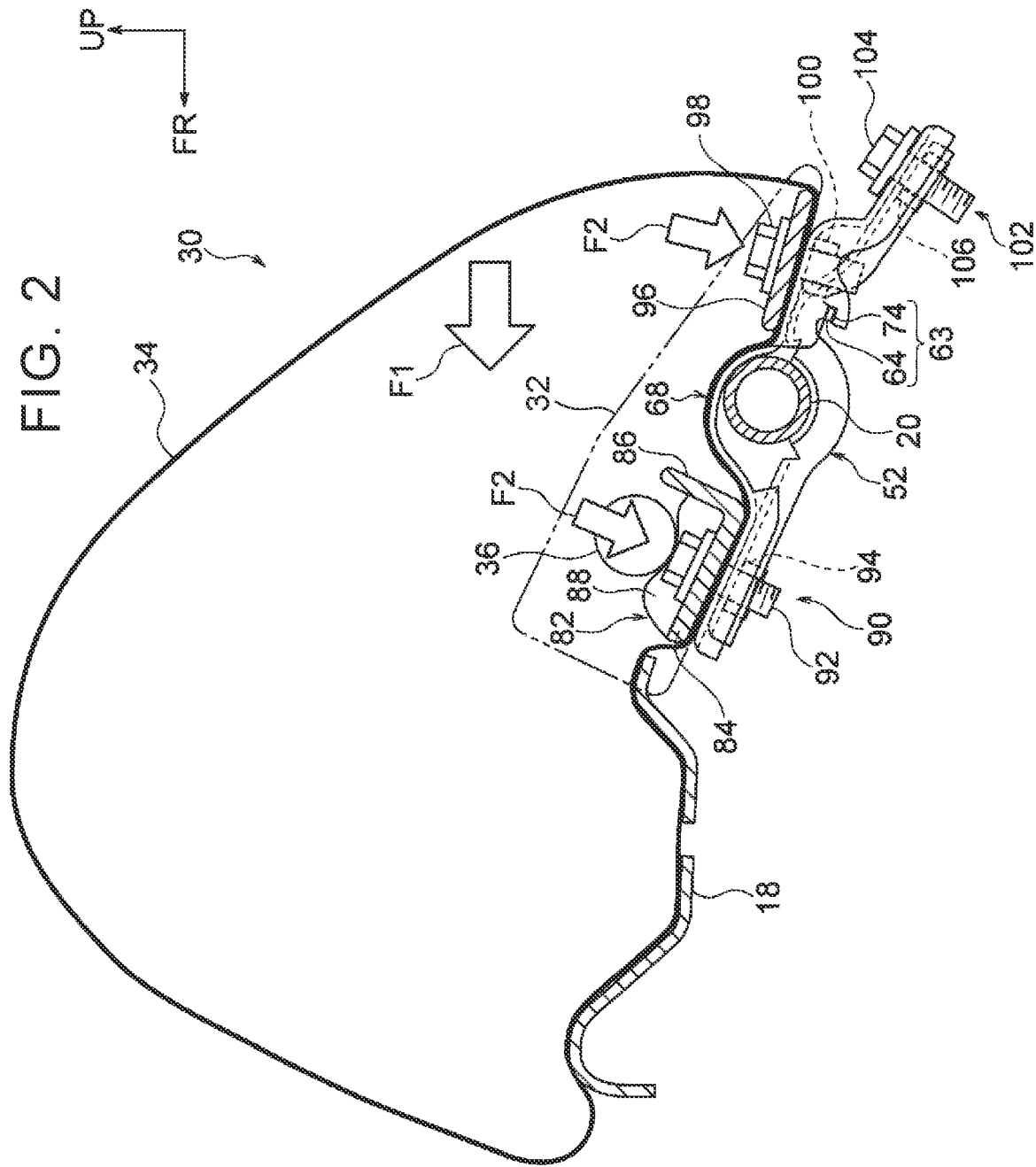
FIG. 2 is an enlarged sectional view of a part of the configuration shown in FIG. 1.

The cushion airbag 34 and the inflator 36 form an airbag module 32 shown in FIGS. 1 and 2. The airbag module 32 is disposed above the front pipe frame 20. The cushion airbag 34 of the airbag module 32 is folded by a predetermined folding method. The airbag module 32 is generally in a wedge shape as viewed in the lateral direction, and its vertical dimension decreases as it gets closer to the rear. The airbag module 32 is disposed in such an attitude that the airbag module 32 is tilted downward in the longitudinal direction with its rear lower than its front. The airbag module 32 is supported by the front pipe frame 20 via a bag support 50 that will be described later.

The inflator 36 is, e.g., a cylinder inflator and is disposed in such an attitude that its axis extends in the lateral direction of the vehicle. The inflator 36 is located forward of the front pipe frame 20 and is supported by the front pipe frame 20 via the bag support 50. As shown in FIG. 1, a control device 38 mounted on the vehicle is electrically connected to the inflator 36. A collision sensor 40 mounted in the front end etc. of the vehicle is electrically connected to the control device 38. The collision sensor 40 is, e.g., an acceleration sensor. The control device 38 is configured to activate the inflator 36 when the control device 38 detects a frontal collision based on a signal from the collision sensor 40. In the case where a collision prediction sensor for predicting (foreseeing) a frontal collision is electrically connected to the control device 38, the control device 38 may be configured to activate the inflator 36 when the control device 38 predicts a frontal collision based on a signal from the collision prediction sensor.

When the inflator 36 is activated, the cushion airbag 34 is inflated and deployed mainly upward (in this example, upward and forward) by the pressure of gas generated by the inflator 36, so that the seat surface of the seat cushion 12 rises. In FIG. 1, the inflated and deployed cushion airbag 34 is shown by a long dashed double-short dashed line, and the airbag module 32 is shown by a continuous line. In FIG. 2, the inflated and deployed cushion airbag 34 is shown by a continuous line, and the airbag module 32 is shown by a long dashed double-short dashed line. In FIG. 1, P represents the pelvis of the occupant seated on the seat cushion 12. The main parts of the present embodiment will be described.

Main Parts of Embodiment

In the present embodiment, as described above, the airbag module 32 of the cushion airbag device 30 is supported by the front pipe frame 20 via the bag support 50. The bag support 50 includes a seat bracket 52 and an airbag bracket 68. The seat bracket 52 and the airbag bracket 68 are fixed to the front pipe frame 20 with the front pipe frame 20 sandwiched between the seat bracket 52 and the airbag bracket 68. The cushion airbag 34 is fixed to the bag support 50 at a position rearward of the front pipe frame 20 in the longitudinal direction of the vehicle.

Although FIGS. 1 and 2 illustrate one seat bracket 52 and one airbag bracket 68, there are actually a pair of seat brackets 52 and a pair of airbag brackets 68. The seat brackets 52 are arranged in the lateral direction of the seat, and the airbag brackets 68 are arranged in the lateral direction of the seat. That is, the bag support 50 includes a pair of right and left seat brackets 52 and a pair of right and left airbag brackets 68. The seat brackets 52 and the airbag brackets 68 are manufactured by, e.g., press-forming a steel plate and have an elongated plate shape that is long in the longitudinal direction. The seat brackets 52 and the airbag brackets 68 are disposed in such an attitude that the seat brackets 52 and the airbag brackets 68 are tilted downward in the longitudinal direction with their rear lower than their front.

As shown in FIGS. 3 to 7, the seat bracket 52 is composed of an upper wall 54 and a pair of right and left side walls 56. The upper wall 54 has a thickness substantially in the vertical direction, and the side walls 56 extend downward from both lateral ends of the upper wall 54. The seat bracket 52 thus has a generally inverted U-shape as viewed in the longitudinal direction. The seat bracket 52 has a through hole 58 in its intermediate part in the longitudinal direction. The through hole 58 is rectangular as viewed in the vertical direction. The upper wall 54 is divided into front and rear parts at the position of the through hole 58. Hereinafter, a part of the upper wall 54 located forward of the through hole 58 is referred to as the "upper wall 54F," and a part of the upper wall 54 located rearward of the through hole 58 is referred to as the "upper wall 54R."

The upper wall 54F has an insertion hole 60 near its middle, and the upper wall 54R has an insertion hole 62 in its rear part. The insertion holes 60, 62 extend through the upper walls 54F, 54R in the vertical direction, respectively. The insertion hole 60 in the upper wall 54F is an elongated hole that is long in the longitudinal direction. The front part of the upper wall 54R has a cutout, not shown, formed from one side in the lateral direction.

Figure 3:
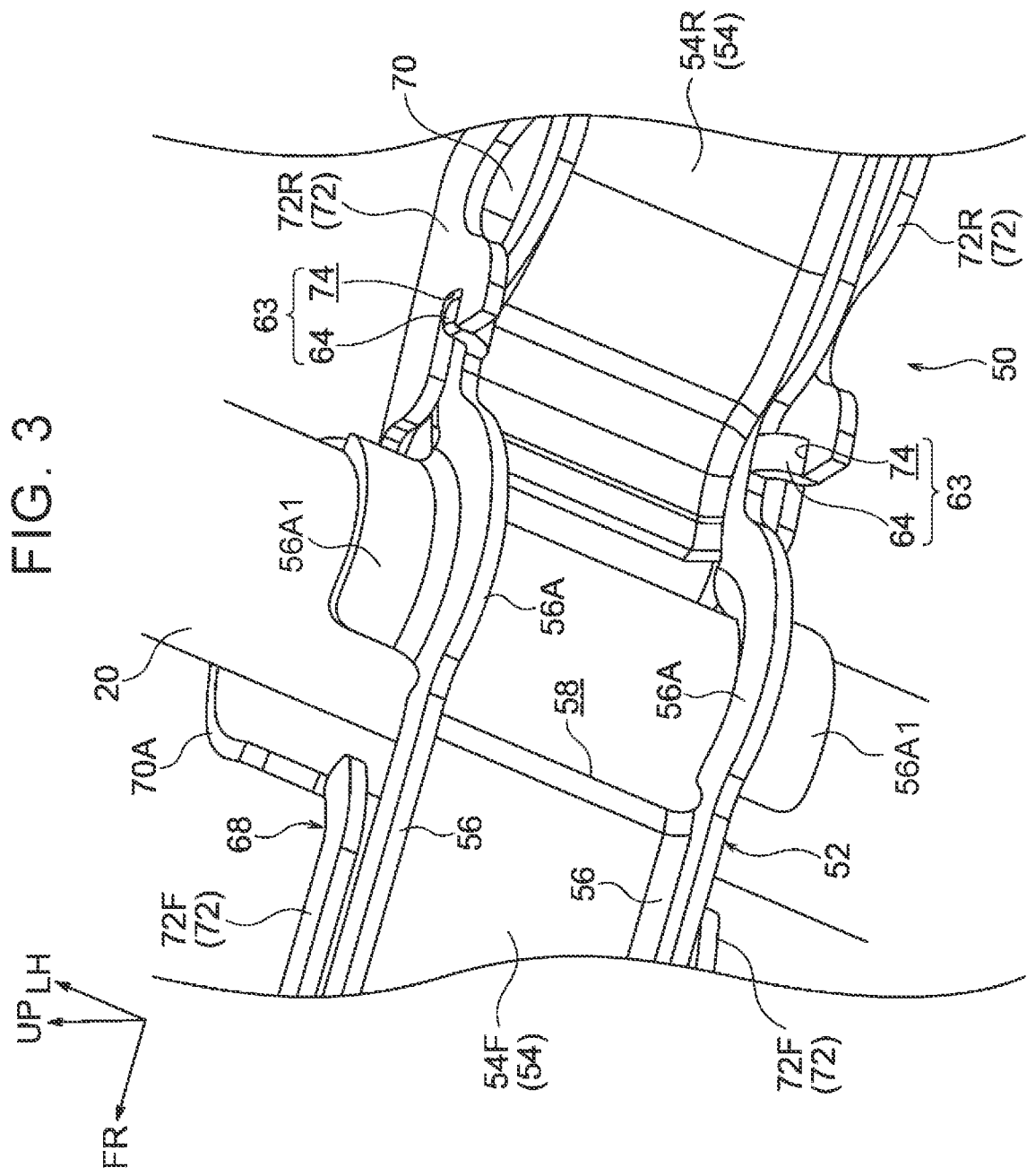
FIG. 3 is an enlarged perspective view of a part of the configuration shown in FIG. 2 as viewed from the lower left side of the vehicle.

Each of the right and left side walls 56 has an arc-shaped portion 56A in the middle in the longitudinal direction. The right and left arc-shaped portions 56A have a generally arc shape that curves downward in the middle, as viewed in the lateral direction. As shown in FIG. 3, each of the right and left arc-shaped portions 56A has a pipe contact portion 56A1 along its upper edge. The pipe contact portions 56A1 protrude outward in the lateral direction with respect to the other parts of the seat bracket 52. The pipe contact portions 56A1 curve concentrically with the outer peripheral surface of the front pipe frame 20. The pipe contact portions 56A1 are in contact with the outer peripheral surface of the front pipe frame 20 from below and are fixed to the front pipe frame 20 by welding.

A protruding piece 64 is formed on each of the right and left side walls 56 at a position near and rearward of the arc-shaped portion 56A. The protruding pieces 64 protrude downward and bend outward in the lateral direction. Each protruding piece 64 corresponds to the "retaining portion" in the disclosure.

As shown in FIGS. 3 to 7, the airbag bracket 68 is composed of an upper wall 70 and a pair of right and left side walls 72. The upper wall 70 has a thickness substantially in the vertical direction, and the side walls 72 extend downward from both lateral ends of the upper wall 70. The airbag bracket 68 thus has a generally inverted U-shape as viewed in the longitudinal direction. The lateral dimension of the airbag bracket 68 is set to be slightly larger than the lateral dimension of the seat bracket 52.

The upper wall 70 has a pipe contact portion 70A in the middle in the longitudinal direction. The pipe contact portion 70A has a generally arc shape that curves upward in the middle, as viewed in the lateral direction. As shown in FIG. 3, the pipe contact portion 70A protrudes outward in the lateral direction with respect to the other parts of the airbag bracket 68. The pipe contact portion 70A has a generally arc shape with a diameter larger than that of the front pipe frame 20, as viewed in the lateral direction. The pipe contact portion 70A is in contact with the front pipe frame 20 from above.

The airbag bracket 68 does not have the right and left side walls 72 at the longitudinal position of the pipe contact portion 70A. That is, the right and left side walls 72 are divided into front and rear parts at the position of the pipe contact portion 70A. Hereinafter, a part of each side wall 72 located forward of the pipe contact portion 70A is referred to as the "side wall 72F," and a part of each side wall 72 located rearward of the pipe contact portion 70A is referred to as the "side wall 72R."

Figure 4:
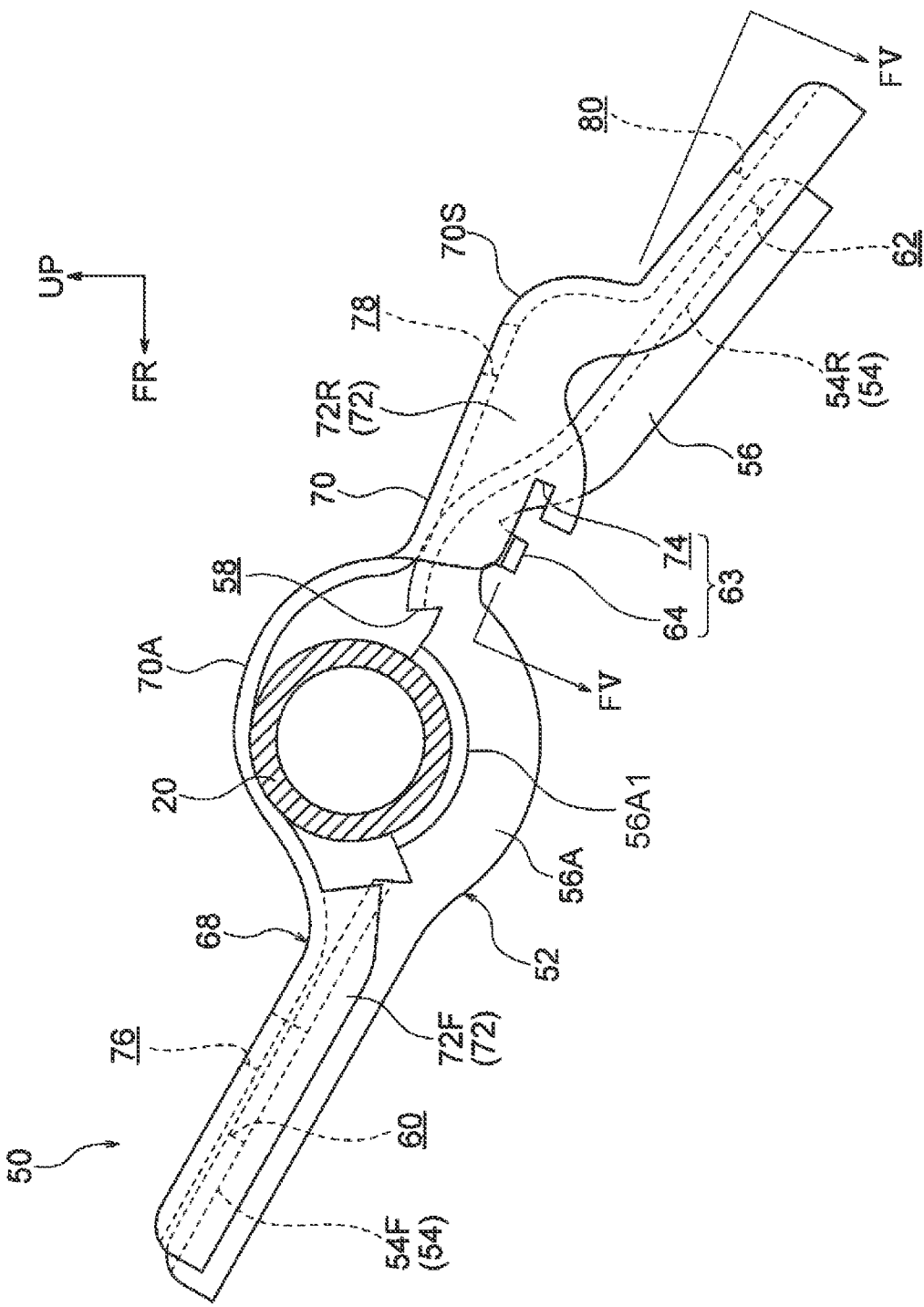
FIG. 4 is a side view of a seat bracket and an airbag bracket in the first embodiment before a stopper portion is retained by a retaining portion when attaching the airbag bracket to the seat bracket.
Figure 6:
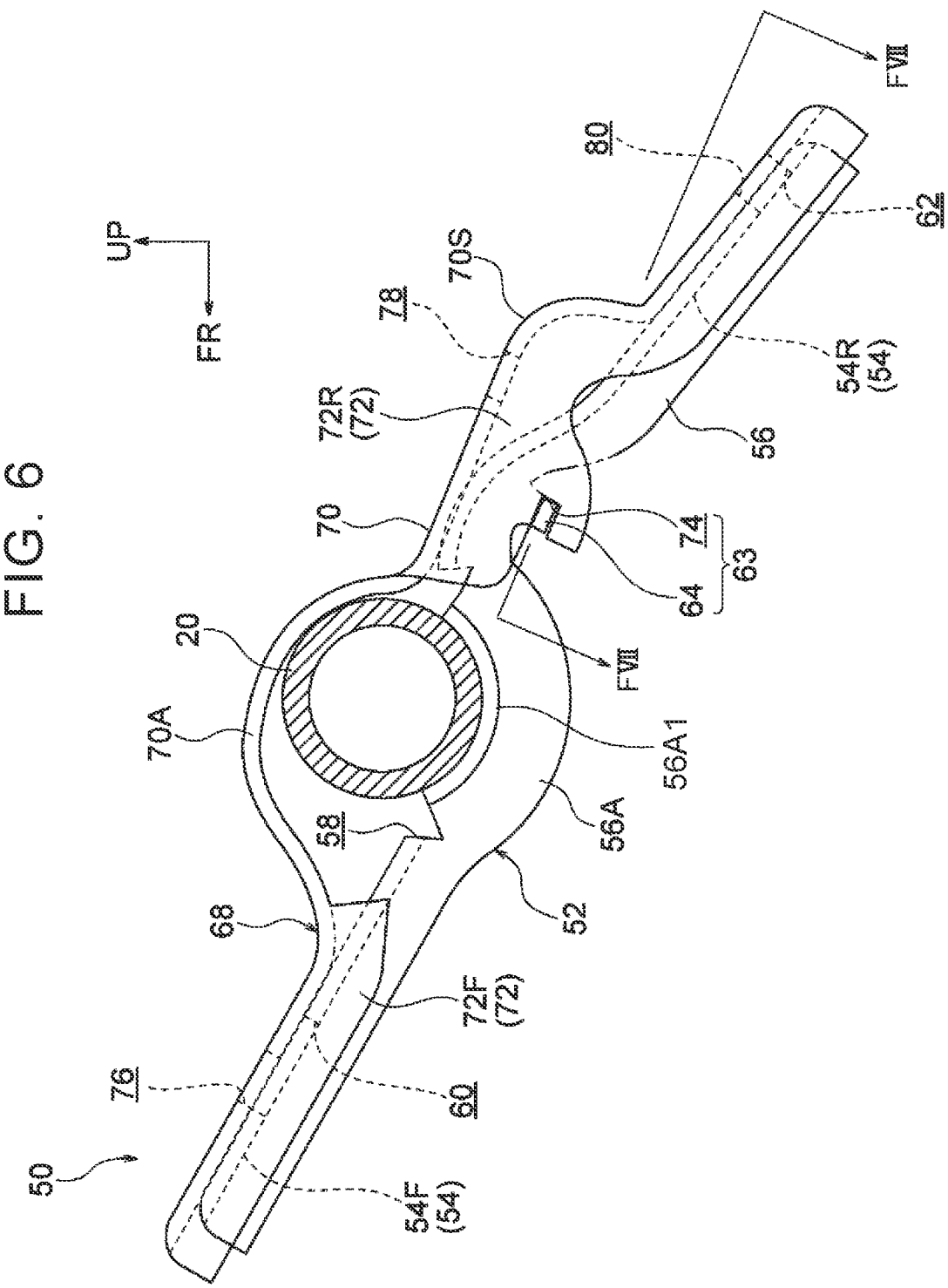
FIG. 6 is a side view of the seat bracket and the airbag bracket in the first embodiment after the stopper portion is retained by the retaining portion when attaching the airbag bracket to the seat bracket.

As shown in FIGS. 4 and 6, the upper wall 70 is cranked at a position rearward of the pipe contact portion 70A, as viewed in the lateral direction. The upper wall 70 therefore has a step 70S that steps down toward the rear. The step 70S is provided in the rear part of the upper wall 70. The front end of each side wall 72R has a cutout portion 74 at a position near and rearward of the pipe contact portion 70A. The cutout portion 74 is formed from the front side of the front end of each side wall 72R. A part of each side wall 72R around the cutout portion 74 protrudes downward with respect to the other parts of the side wall 72R. Each cutout portion 74 corresponds to the "stopper portion" in the disclosure. Each cutout portion 74 includes a cutout and its peripheral region.

The upper wall 70 has an insertion hole 76 in its front end, has an insertion hole 78 in the step 70S, and has an insertion hole 80 in its rear end. The insertion holes 76, 78, and 80 extend through the upper wall 70 in the vertical direction.

As shown in FIG. 2, the airbag module 32 is disposed above the airbag brackets 68. As described above, the cushion airbag 34 of the airbag module 32 is folded by a predetermined folding method. A front retainer 82 and a rear retainer 96 are disposed in the front and rear parts of the folded cushion airbag 34, respectively. The front retainer 82 and the rear retainer 96 are made of, e.g., a steel plate.

The front retainer 82 has an elongated shape that is long in the lateral direction. The front retainer 82 extends between the upper surfaces of the front ends of the right and left airbag brackets 68. The front retainer 82 has a lower wall 84 and a rear wall 86. The lower wall 84 has a thickness substantially in the vertical direction, and the rear wall 86 extends upward from the rear end of the lower wall 84. The front retainer 82 thus has an L-shape as viewed in the lateral direction. The front retainer 82 further has a plurality of ribs 88 extending upward from the upper surface of the lower wall 84 and connected integrally to the rear wall 86. The ribs 88 are arranged in the lateral direction. The inflator 36 described above is fixed to the upper ends of the ribs 88. The inflator 36 is placed in the cushion airbag 34 as described above.

Stud bolts 92 are placed in both lateral ends of the lower wall 84. The stud bolts 92 are, e.g., weld bolts, and heads of the stud bolts 92 are fixed (welded) to the lower wall 84. Threaded portions of the stud bolts 92 are inserted through insertion holes, not shown, formed in the lower wall 84 and the cushion airbag 34, and protrude downward (i.e., outward) from the airbag module 32. The threaded portions of the stud bolts 92 protruding downward from the airbag module 32 are inserted through the insertion holes 76 (see FIGS. 4 and 6) formed in the front ends of the upper walls 70 of the airbag brackets 68 and protrude downward from the upper walls 70. Each stud bolt 92 corresponds to "the stud bolt for the inflator" in the disclosure.

The rear retainer 96 has an elongated shape that is long in the lateral direction. The rear retainer 96 extends between the upper surfaces of the steps 70S of the right and left airbag brackets 68. The rear retainer 96 has a plate shape having a thickness substantially in the vertical direction. Stud bolts 98 are placed in both lateral ends of the rear retainer 96. The stud bolts 98 are, e.g., weld bolts, and heads of the stud bolts 98 are fixed (welded) to the rear retainer 96. Threaded portions of the stud bolts 98 are inserted through insertion holes, not shown, formed in the rear retainer 96 and the cushion airbag 34, and protrude downward (i.e., outward) from the rear retainer 96. The threaded portions of the stud bolts 98 protruding downward from the rear retainer 96 are inserted through the insertion holes 78 (see FIGS. 4 and 6) formed in the steps 70S of the airbag brackets 68 and protrude from the lower surfaces of the steps 70S. The threaded portions of the stud bolts 98 protruding from the lower surfaces of the steps 70S are screwed into nuts 100 on the lower surface side of the steps 70S. The cushion airbag 34 is thus fixed to the steps 70S of the airbag brackets 68.

Figure 5:
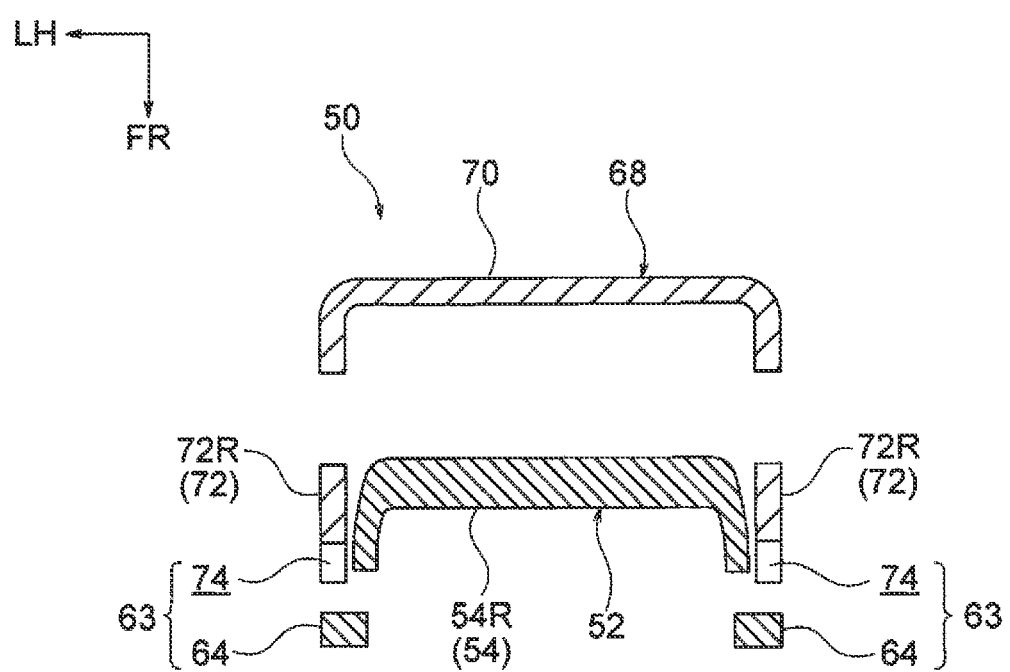
FIG. 5 is a sectional view taken along line FV-FV in FIG. 4.
Figure 7:
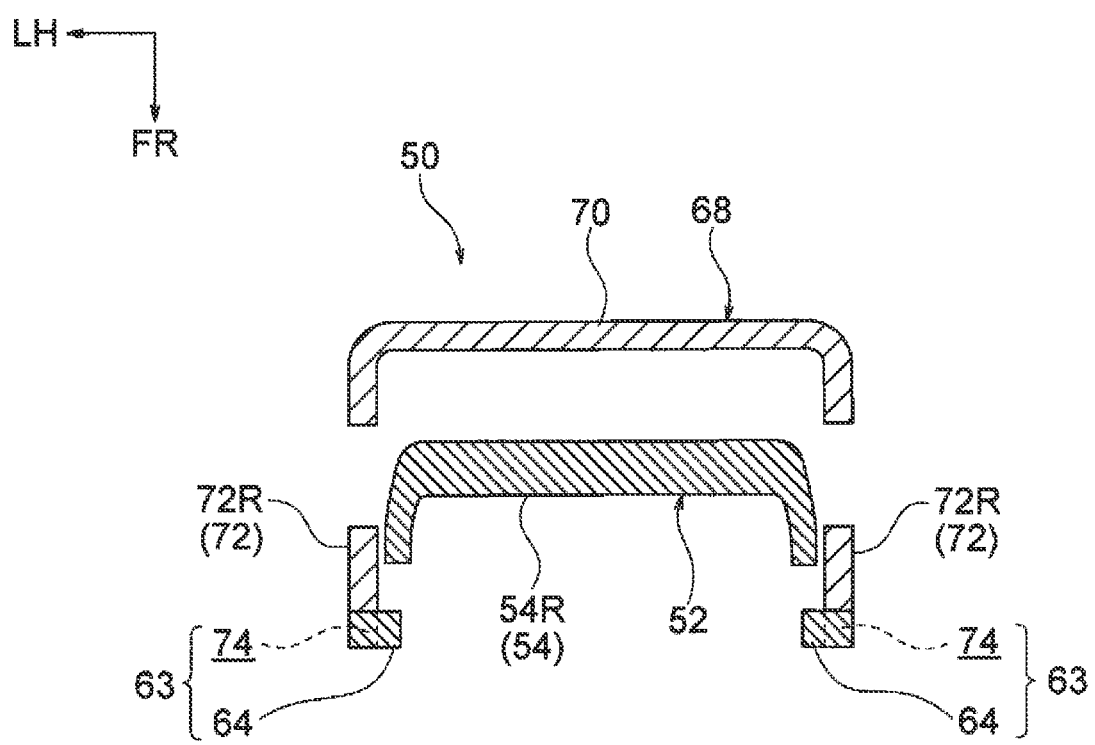
FIG. 7 is a sectional view taken along line FVII-FVII in FIG. 6.

When attaching the airbag bracket 68 to the seat bracket 52, the airbag bracket 68 is placed on top of the seat bracket 52 with the cutout portions 74 located slightly rearward of the protruding pieces 64, as shown in FIGS. 4 and 5. Thereafter, as shown in FIGS. 6 and 7, the airbag bracket 68 is slid forward with respect to the seat bracket 52 so that the protruding pieces 64 are fitted in the cutout portions 74. The protruding pieces 64 are thus slid under and retained by the upper edges of the cutout portions 74, and the seat bracket 52 and the airbag bracket 68 are fixed to each other in the vertical direction. Each protruding piece 64 and each cut portion 74 are located at a position near and rearward of the front pipe frame 20 and forms a fixing portion 63.

Although the airbag module 32 is not shown in FIGS. 4 to 7, the airbag brackets 68 are attached to the seat brackets 52 as described above with the airbag module 32 fixed to the airbag brackets 68. That is, when placing the airbag bracket 68 on top of the seat bracket 52, the front stud bolt 92 is inserted through the insertion hole 60 (elongated hole) formed in the upper wall 54F of the seat bracket 52. At this time, the rear stud bolt 98 and the nut 100 are inserted into the cutout, not shown, formed in the front part of the upper wall 54R of the seat bracket 52. In this state, the airbag bracket 68 is slid forward with respect to the seat bracket 52. The airbag bracket 68 and the seat bracket 52 are thus attached to each other as shown in FIGS. 6 and 7.

A nut 94 is then screwed on the threaded portion of the stud bolt 92 from below the upper wall 54F. The seat bracket 52 and the airbag bracket 68 are thus fixed to each other in a front fixing portion 90 located forward of the front pipe frame 20. In the state shown in FIGS. 6 and 7, the insertion hole 80 formed in the rear end of the upper wall 70 of the airbag bracket 68 and the insertion hole 62 formed in the rear part of the upper wall 54R of the seat bracket 52 are lined up with each other in the vertical direction. A bolt 104 is inserted into the insertion holes 80, 62 from above. A threaded portion of the bolt 104 is screwed into a nut 106 on the lower surface side of the upper wall 54R. The seat bracket 52 and the airbag bracket 68 are thus fixed to each other in a rear fixing portion 102 located rearward of the fixing portions 63. The nut 106 is, e.g., a weld nut and is fixed (welded) to the lower surface of the upper wall 54R.

Functions and Effects

Functions and effects of the first embodiment will be described.

In the vehicle seat 10 with the above configuration, the front panel 18 extends between the front parts of the right and left side frames 16 of the seat cushion 12. The front pipe frame 20 extends between the front parts of the right and left side frames 16 at a position rearward of the front panel 18 in the longitudinal direction of the vehicle. The bag support 50 is fixed to the front pipe frame 20. The cushion airbag device 30 that inflates and deploys the cushion airbag 34 in the event of a frontal collision of the vehicle is mounted in the front part of the seat cushion 12.

The cushion airbag 34 is fixed to the bag support 50 at a position rearward of the front pipe frame 20. Accordingly, as shown in FIG. 1, the inflated and deployed position of the cushion airbag 34 is closer to the pelvis P of the occupant in a normal state. The pelvis P is therefore restrained in the initial stage of the collision. Moreover, a load applied to the cushion airbag 34 from the pelvis P moving forward due to inertia is transmitted to the front pipe frame 20 via the bag support 50.

Specifically, as shown in FIG. 2, an input load F1 to the cushion airbag 34 is transmitted as loads F2 to the bag support 50 from the front fixing portion 90, the rear fixing portion 102, etc. The loads F2 transmitted to the bag support 50 are satisfactorily transmitted to the front pipe frame 20 sandwiched between the seat bracket 52 and the airbag bracket 68. Since the seat bracket 52 and the airbag bracket 68 are fixed to each other at a position rearward of the front pipe frame 20, efficiency of load transmission from the bag support 50 to the front pipe frame 20 is improved.

Moreover, since the cushion airbag 34 is fixed to the bag support 50 at a position rearward of the front pipe frame 20, the rear end of the cushion airbag 34 is prevented from being lifted by the input load F1. As a result, the cushion airbag 34 is prevented or effectively restrained from falling forward, and a sufficient reaction force for restraining forward movement of the pelvis P is obtained. Since the forward movement of the pelvis P is thus effectively restrained in the early stage, submarining is more effectively reduced. Since submarining is reduced, the burden on the lumbar spine of the occupant is reduced.

Figure 8:
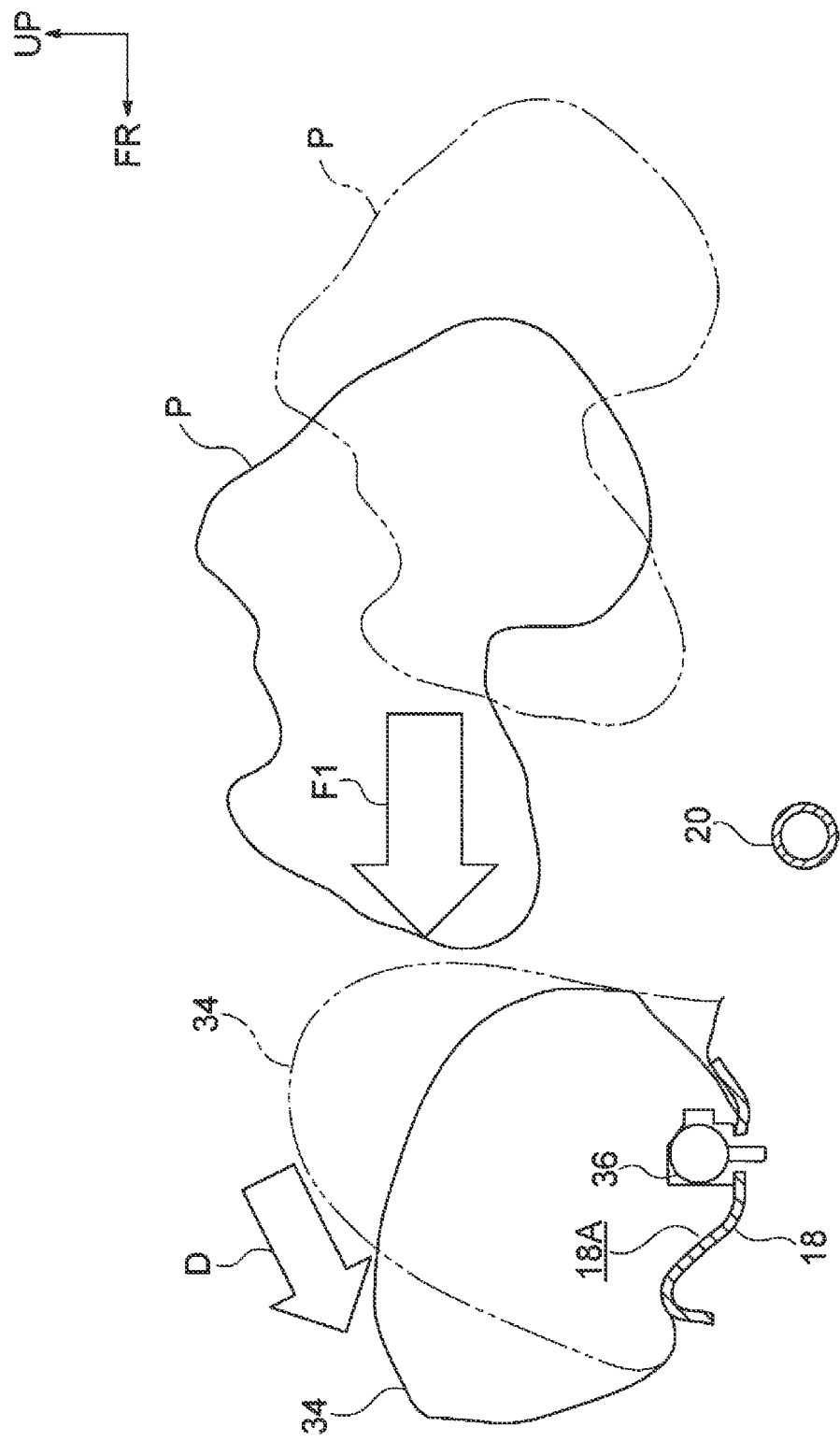
FIG. 8 illustrates a cushion airbag device of a comparative example.

The above effects will be additionally described using a comparative example shown in FIG. 8. In FIG. 8, configurations similar to the embodiment are denoted with the same signs as those of the embodiment. In the comparative example, the cushion airbag device 30 is placed in a storage recess 18A of the front panel 18 located forward of the front pipe frame 20. The inflated and deployed position of the cushion airbag 34 of the cushion airbag device 30 is located away from the occupant's pelvis P in the forward direction of the vehicle. The cushion airbag 34 therefore restrains the pelvis P of the occupant with a small force in the initial stage of a frontal collision before the pelvis P moves forward due to inertia by the impact of the frontal collision (see the pelvis P and the cushion airbag 34 each shown by a long dashed double-short dashed line in FIG. 8).

In the comparative example, only the lower end of the cushion airbag 34 that is inflated and deployed upward from the storage recess 18A of the front panel 18 is supported by the front panel 18. The input load F1 to the cushion airbag 34 is therefore not efficiently transmitted to the cushion frame 14, and the cushion airbag 34 falls forward. As a result, a sufficient reaction force for restraining the forward movement of the pelvis P cannot be obtained. Submarining is therefore less effectively reduced. In this respect, in the embodiment, the inflated and deployed position of the cushion airbag 34 is closer to the pelvis P of the occupant in a normal state, and the cushion airbag 34 is supported by the front pipe frame 20. The embodiment thus solves the problems of the comparative example.

In the case where the airbag module 32 is disposed rearward of the front pipe frame 20, submarining can be more effectively reduced. However, such a configuration causes reduced seating comfort of the seat cushion 12. In this respect, in the embodiment, the vertical dimension of the airbag module 32 disposed above the front pipe frame 20 decreases as it gets closer to the rear. This configuration prevents or effectively reduces reduction in sitting comfort of the seat cushion 12.

In the embodiment, the bag support 50 includes the seat brackets 52 fixed to the front pipe frame 20 and the airbag brackets 68 disposed above the seat brackets 52. The cushion airbag 34 is fixed to the airbag brackets 68 at a position rearward of the front pipe frame 20 in the longitudinal direction of the vehicle. The seat bracket 52 and the airbag bracket 68 are fixed to each other in the fixing portions 63 at a position near and rearward of the front pipe frame 20. The cushion airbag 34 can thus be strongly supported by the front pipe frame 20 at a position rearward of the front pipe frame 20.

Moreover, in the fixing portions 63, the protruding pieces 64 formed in the right and left side walls 56 of the seat bracket 52 are fitted in the cutout portions 74 formed on the right and left side walls 72 of the airbag bracket 68, the cutout portions 74 are retained in the protruding pieces 64. The seat bracket 52 and the airbag bracket 68 are thus fixed to each other in the vertical direction. This retaining and fixing structure facilitates the fixing work.

For example, even in the case where a constituent member of the seat cushion 12 such as a motor is disposed below the fixing portions 63, the above retaining structure allows the fixing work to be performed without using a tool. The retaining structure is therefore suitable as it eliminates the need to secure a space for inserting a tool around the constituent member.

In each fixing portion 63, the cutout portion 74 that is the stopper portion is configured to be retained by the protruding piece 64 that is the retaining portion by sliding the cutout portion 74 forward into the protruding piece 64. For example, this configuration is suitable when it is difficult to secure a space for sliding in the lateral direction of the vehicle.

In the embodiment, the seat brackets 52 are welded to the front pipe frame 20. The seat brackets 52 are welded to the front pipe frame 20 when, e.g., the cushion frame 14 is manufactured. This configuration facilitates the work of fixing the airbag brackets 68 to the seat brackets 52 when mounting the airbag module 32 of the cushion airbag device 30 in the seat cushion 12.

In the embodiment, the seat brackets 52 and the airbag brackets 68 are fixed to each other both in the fixing portions 63 located rearward of the front pipe frame 20 and in the front fixing portions 90 located forward of the front pipe frame 20. With this configuration, an excessive load applied from the occupant's pelvis P to the cushion airbag 34 is satisfactorily transmitted to the front pipe frame 20 via the brackets 52, 68.

In the embodiment, the seat brackets 52 and the airbag brackets 68 are fixed to each other both in the fixing portions 63 located rearward of the front pipe frame 20 and in the rear fixing portions 102 located rearward of the fixing portions 63. This configuration reinforces the fixing portions 63 against the excessive load that is applied from the occupant's pelvis P to the cushion airbag 34.

In the embodiment, the inflator 36 of the cushion airbag device 30 is placed in the cushion airbag 34 at a position forward of the front pipe frame 20. In each front fixing portion 90, the stud bolt 92 for the inflator 36 is passed through the airbag bracket 68 and the seat bracket 52 and is screwed into the nut 94. That is, the stud bolt 92 for the inflator 36 is also used to fix the seat bracket 52 and the airbag bracket 68 together. This configuration reduces the number of parts and the number of man-hours for the fixing work.

Next, other embodiments of the disclosure will be described. Configurations and functions that are basically similar to those of the first embodiment are denoted by the same signs as those of the first embodiment, and description thereof will be omitted.

Second Embodiment

Figure 9:
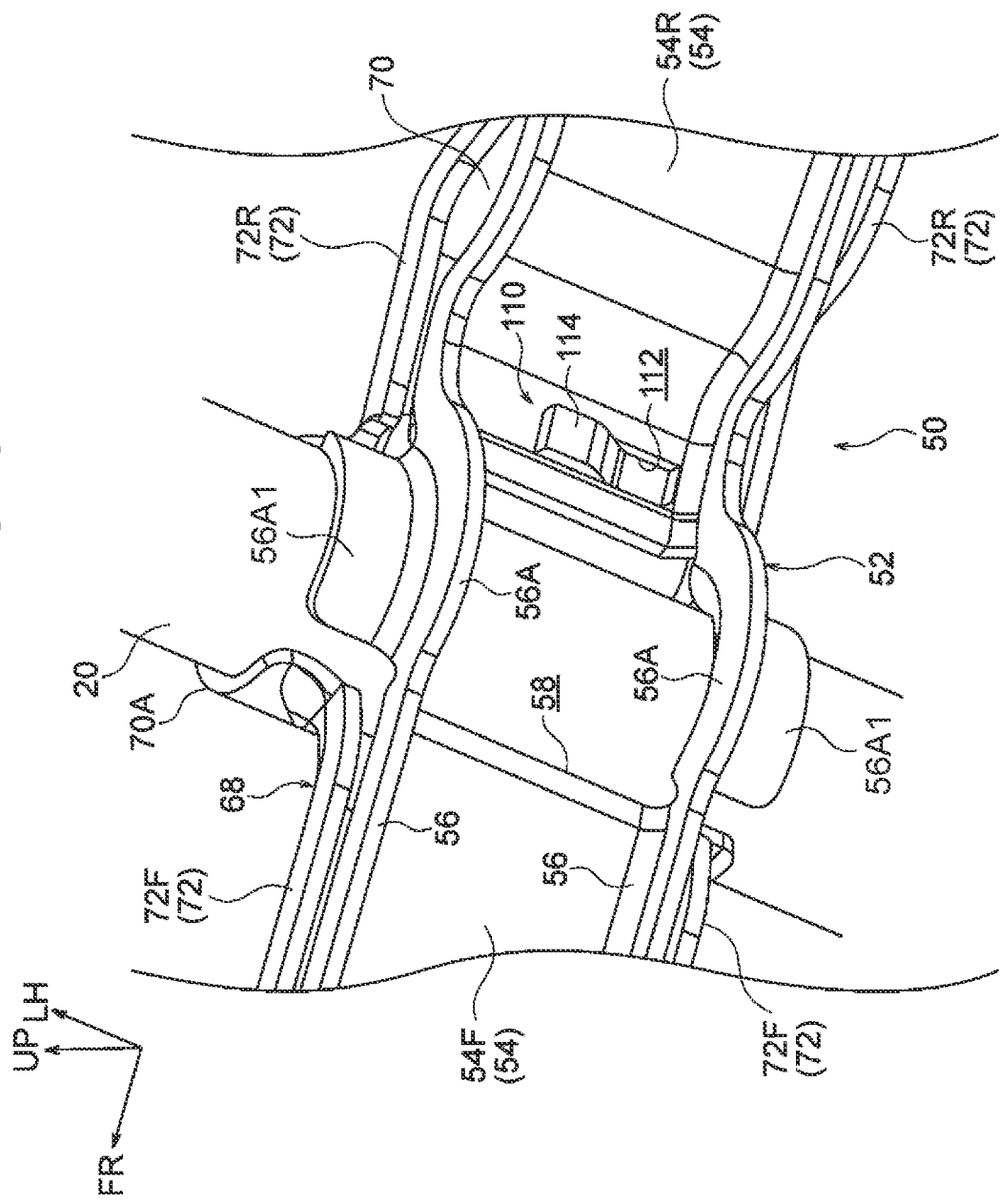
FIG. 9 is a perspective view corresponding to FIG. 3, illustrating a part of the configuration of a seat cushion of a vehicle seat according to a second embodiment.

FIG. 9 is a perspective view corresponding to FIG. 3, illustrating a part of the configuration of a seat cushion of a vehicle seat according to a second embodiment of the disclosure. In the present embodiment, the bag support 50 has fixing portions 110 different from the fixing portions 63 of the first embodiment. Each fixing portion 110 is composed of a retaining hole 112 formed in the seat bracket 52 and a stopper tab 114 formed in the airbag bracket 68. The retaining hole 112 is a retaining portion, and the stopper tab 114 is a stopper portion.

The retaining hole 112 is formed in the front end of the upper wall 54R of the seat bracket 52. The retaining hole 112 is rectangular as viewed in the vertical direction. The retaining hole 112 includes a hole and its peripheral region. The stopper tab 114 is formed in the upper wall 70 of the airbag bracket 68 at a position near and rearward of the pipe contact portion 70A. The stopper tab 114 is formed by cutting a part of the upper wall 70 and bending the cut part of the upper wall 70 downward. The stopper tab 114 has an L-shape as viewed in the longitudinal direction. The retaining hole 112 and the stopper tab 114 are disposed at a position offset to one side in the lateral direction (in this example, the right side) with respect to the middle of the bag support 50 in the lateral direction.

In the present embodiment, the pipe contact portion 70A of the airbag bracket 68 has an arc shape that is concentric with the front pipe frame 20, as viewed in the lateral direction. The lateral dimension of the airbag bracket 68 is set to be slightly larger than in the first embodiment.

Figure 10:
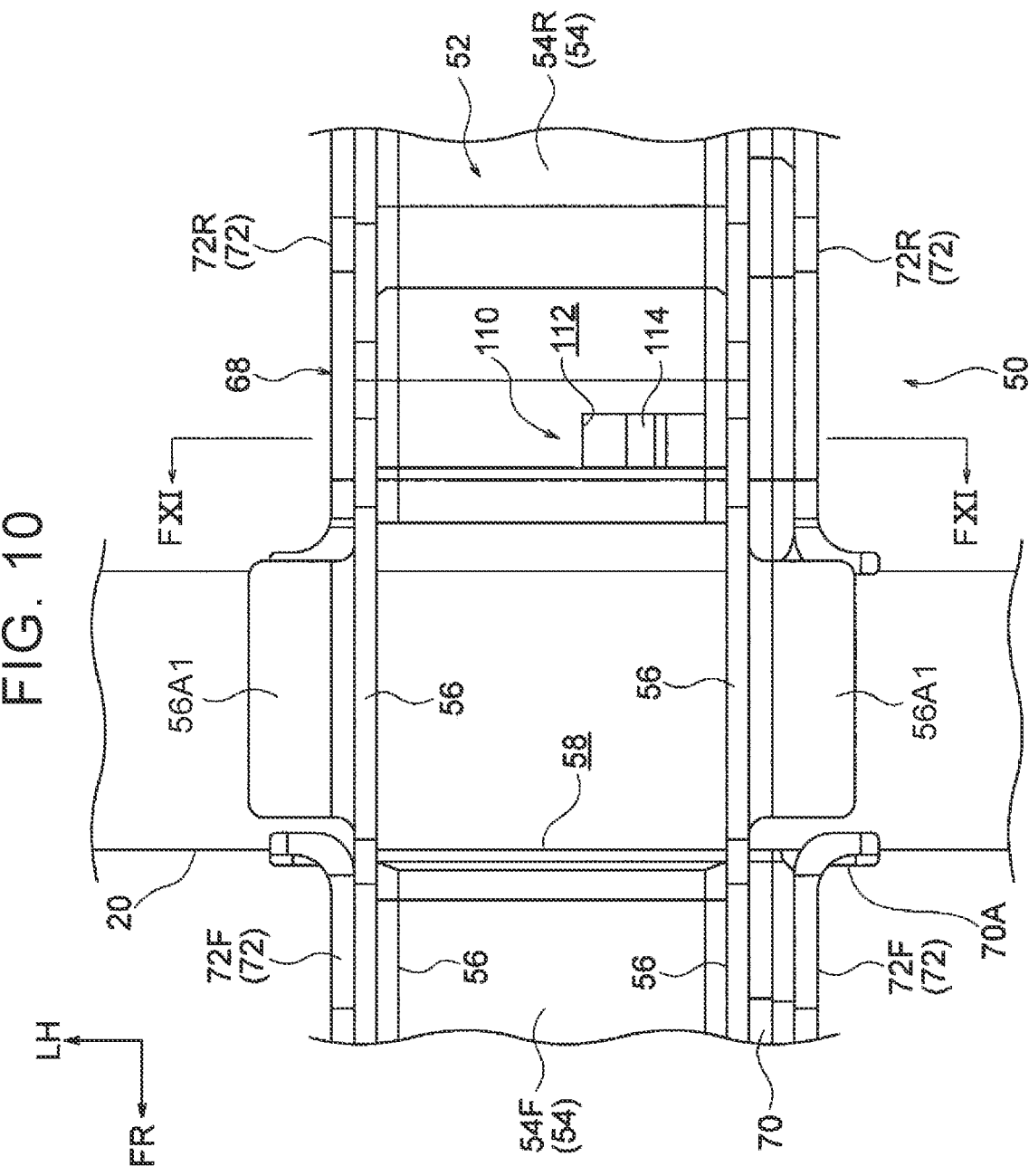
FIG. 10 is a bottom view of a seat bracket and an airbag bracket in the second embodiment before a stopper portion is retained by a retaining portion when attaching the airbag bracket to the seat bracket.
Figure 11:
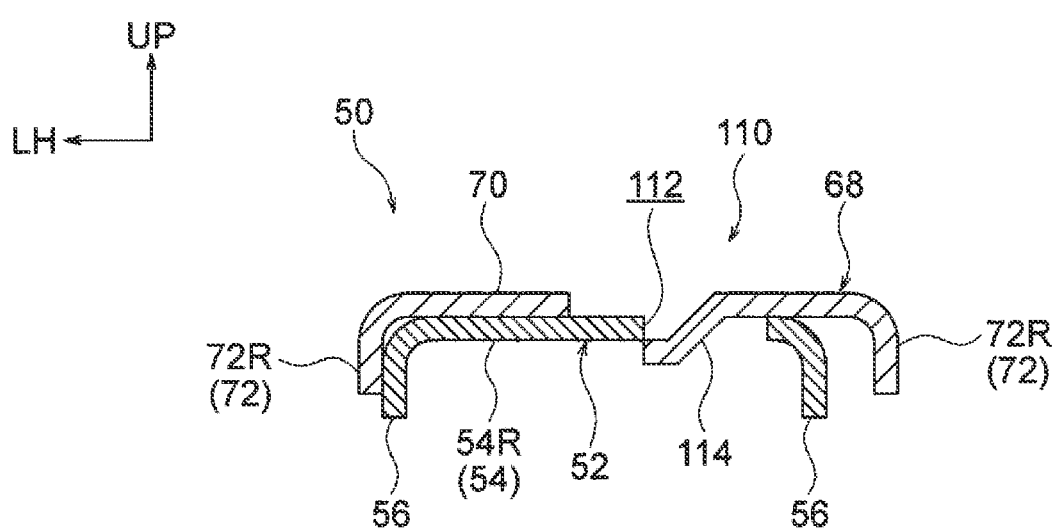
FIG. 11 is a sectional view taken along line FXI-FXI in FIG. 10.
Figure 12:
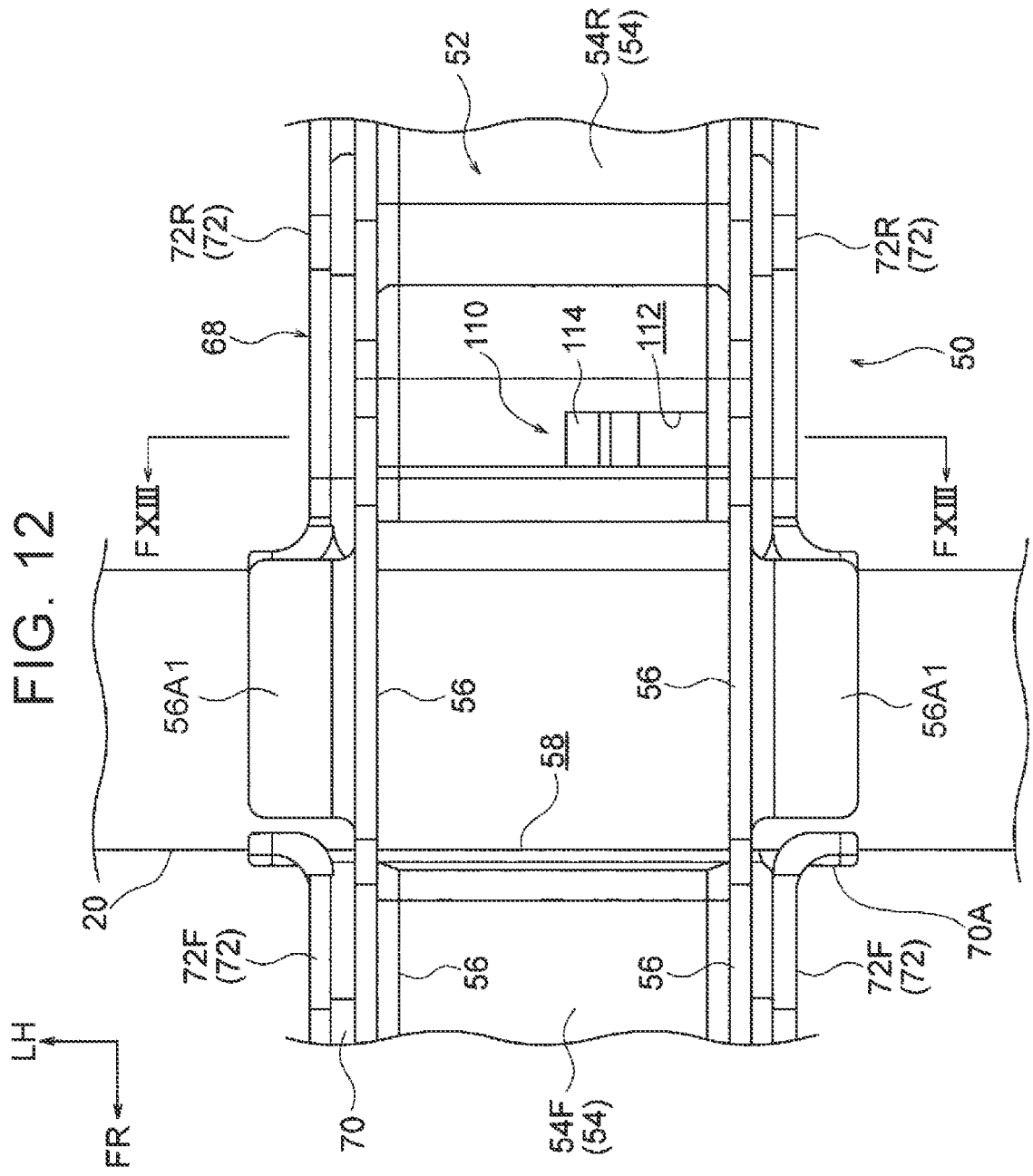
FIG. 12 is a bottom view of the seat bracket and the airbag bracket in the second embodiment after the stopper portion is retained by the retaining portion when attaching the airbag bracket to the seat bracket.
Figure 13:
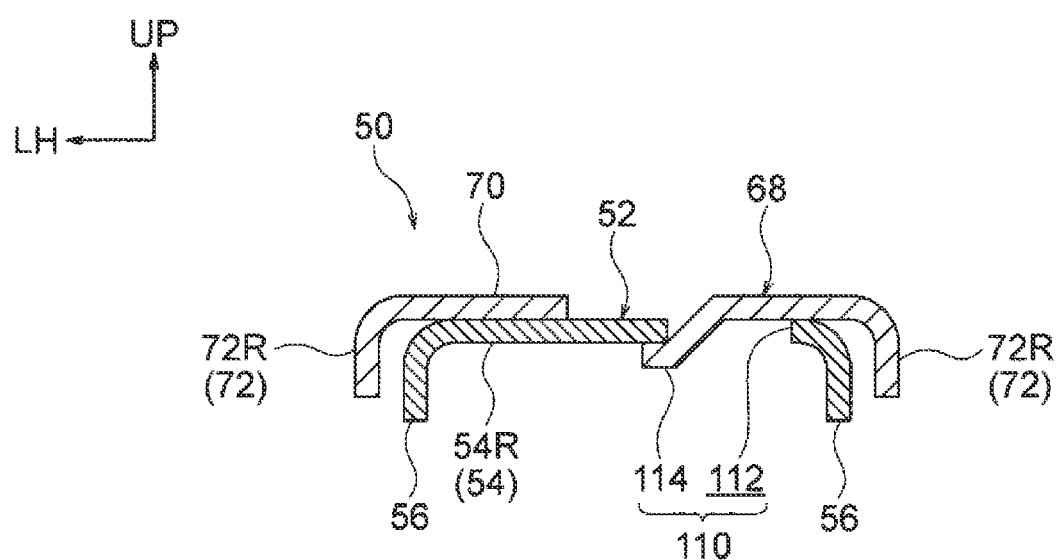
FIG. 13 is a sectional view taken along line FXIII-FXIII in FIG. 12.

When attaching the airbag bracket 68 to the seat bracket 52, the airbag bracket 68 is placed on top of the seat bracket 52 so as to be offset to one side in the lateral direction (in this example, the right side; one side in the lateral direction of the vehicle) with respect to the seat bracket 52, as shown in FIGS. 10 and 11. The stopper tab 114 is thus inserted into the retaining hole 112. In this state, the airbag bracket 68 is slid with respect to the seat bracket 52 toward the other side in the lateral direction (in this example, the left side; the other side in the lateral direction of the vehicle). As shown in FIGS. 12 and 13, the stopper tab 114 is thus slid under and retained by the edge of the retaining hole 112, and the airbag bracket 68 and the seat bracket 52 are fixed to each other in the vertical direction.

Configurations of the second embodiment other than those described above are similar to the first embodiment. In the present embodiment as well, submarining is more effectively reduced as in the first embodiment. In the present embodiment, the stopper tab 114 that is the stopper portion is configured to be retained by the retaining hole 112 that is the retaining portion by sliding the stopper tab 114 in the lateral direction of the vehicle into the retaining hole 112. For example, this configuration is suitable when it is difficult to secure a space for sliding in the longitudinal direction of the vehicle.

Third Embodiment

Figure 14:
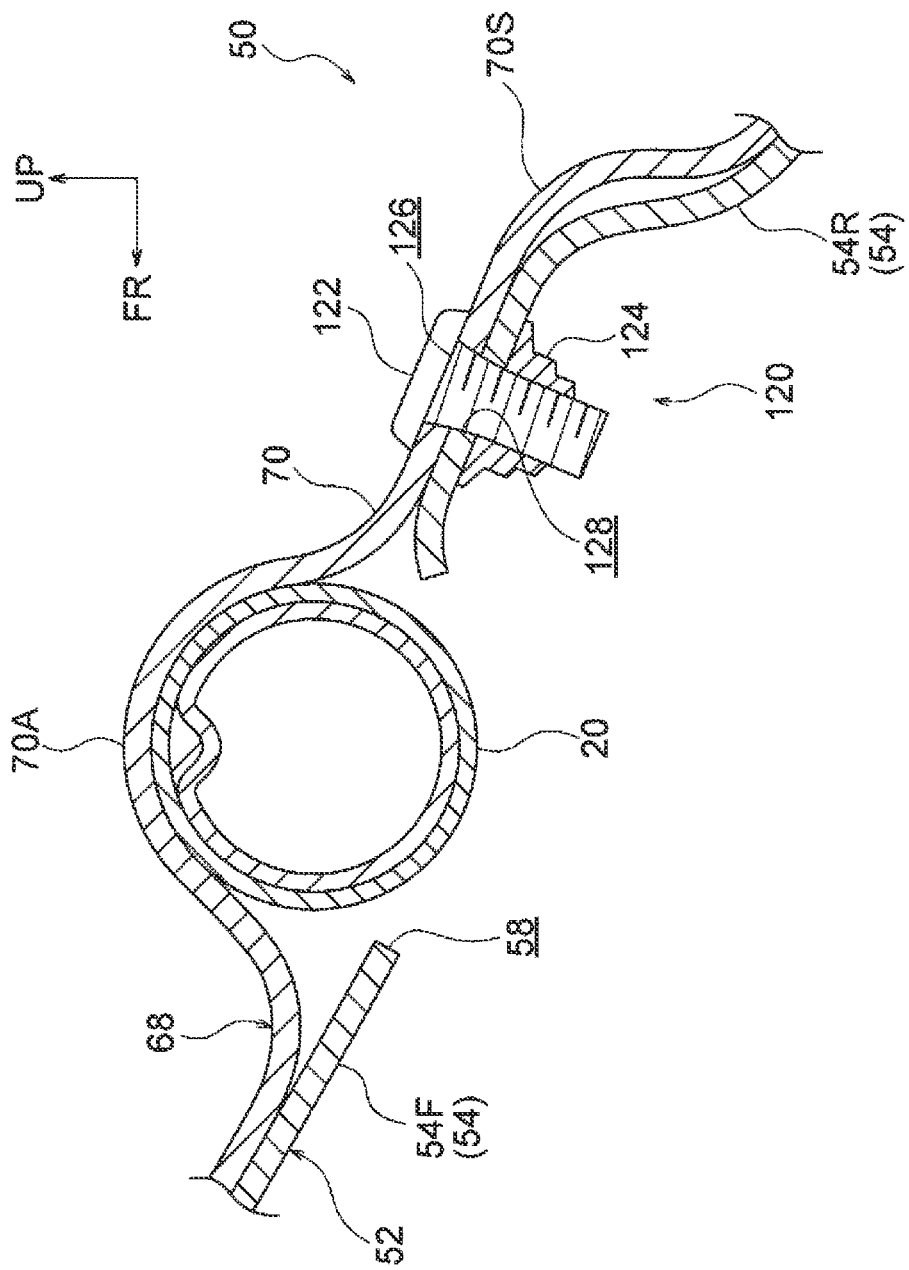
FIG. 14 is a sectional view corresponding to a part of FIG. 2, illustrating a part of the configuration of a seat cushion of a vehicle seat according to a third embodiment.

FIG. 14 is a sectional view corresponding to a part of FIG. 2, illustrating a part of the configuration of a seat cushion of a vehicle seat according to a third embodiment of the disclosure. In the present embodiment, the bag support 50 has fixing portions 120 different from the fixing portions 63 in the first embodiment. In each fixing portion 120, the seat bracket 52 and the airbag bracket 68 are fastened and fixed by a bolt 122 and a nut 124. The bolt 122 is, e.g., a weld nut, and a head of the bolt 122 is fixed (welded) to the upper wall 70 of the airbag bracket 68. A threaded portion of the bolt 122 is inserted from above through an insertion hole 126 formed in the upper wall 70 of the airbag bracket 68 and an insertion hole 128 formed in the upper wall 54R of the seat bracket 52, and protrudes downward from the upper wall 54R. The nut 124 is screwed on the protruding part of the threaded portion of the bolt 122. The airbag bracket 68 and the seat bracket 52 are thus fixed to each other at a position rearward of the front pipe frame 20. Configurations of the present embodiment other than those described above are similar to the first embodiment. In the present embodiment as well, submarining is more effectively reduced as in the first embodiment.

Fourth Embodiment

Figure 15:
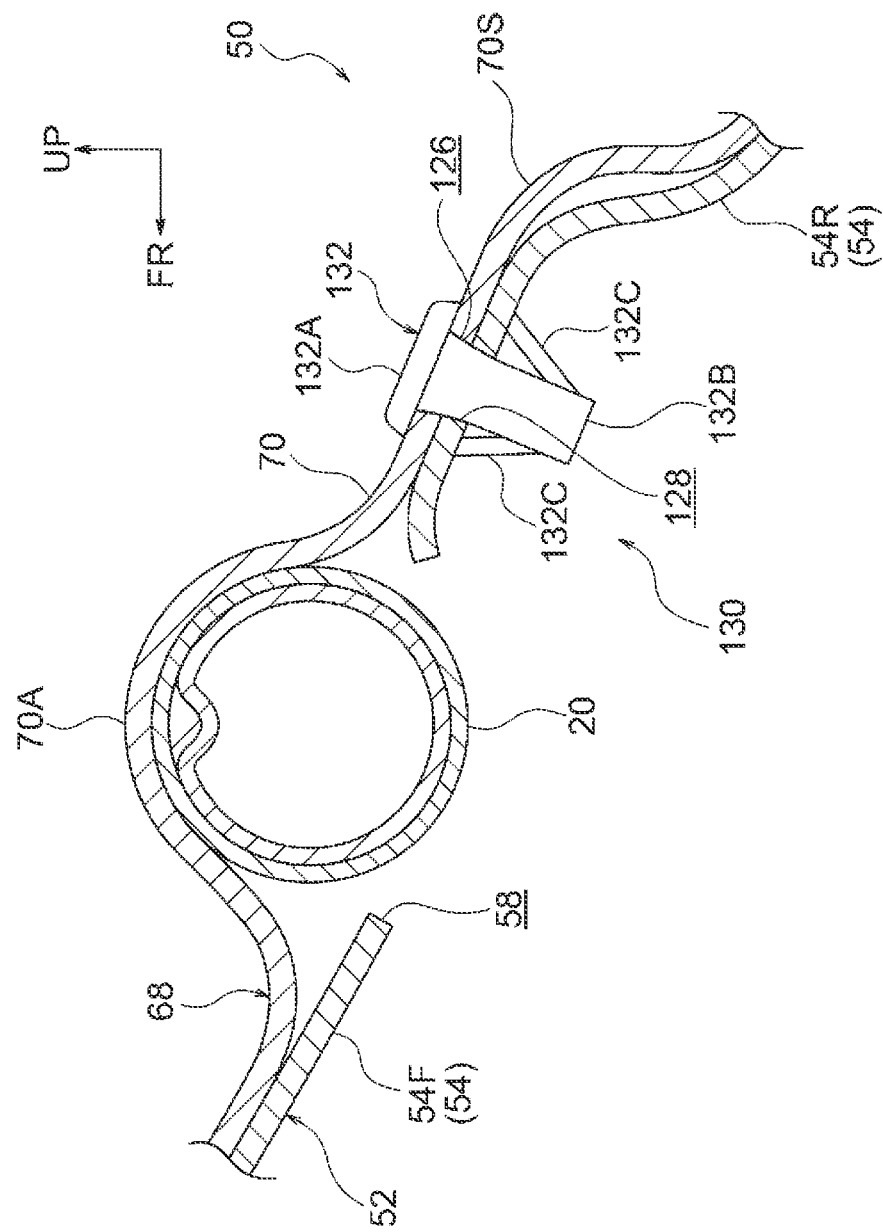
FIG. 15 is a sectional view corresponding to a part of FIG. 2, illustrating a part of the configuration of a seat cushion of a vehicle seat according to a fourth embodiment.

FIG. 15 is a sectional view corresponding to a part of FIG. 2, illustrating a part of the configuration of a seat cushion of a vehicle seat according to a fourth embodiment of the disclosure. In the present embodiment, the bag support 50 has a fixing portion 130 different from the fixing portions 63 in the first embodiment. The fixing portion 130 is similar to the fixing portion 120 in the third embodiment, but the seat bracket 52 and the airbag bracket 68 are fixed together by a clip 132 instead of the bolt 122 and the nut 124.

The clip 132 is made of, e.g., metal and has a head 132A and a shank 132B. The head 132A is integral with one axial end of the shank 132B and has a larger diameter than the shank 132B. The head 132A is fixed to the upper wall 70 of the airbag bracket 68 by welding. The shank 132B is inserted from above through an insertion hole 126 formed in the upper wall 70 of the airbag bracket 68 and an insertion hole 128 formed in the upper wall 54R of the seat bracket 52, and protrudes downward from the upper wall 54R. A plurality of claws 132C protrudes from the tip end of the shank 132B toward the base end of the shank 132B and outward in the radial direction of the shank 132B. When the shank 132B is inserted through the insertion holes 126, 128, the claws 132C are first elastically deformed inward in the radial direction of the shank 132B and are then elastically restored and retained by the lower surface of the upper wall 54R. The airbag bracket 68 and the seat bracket 52 are thus fixed to each other at a position rearward of the front pipe frame 20. Configurations of the present embodiment other than those described above are similar to the first embodiment. In the present embodiment as well, submarining is more effectively reduced as in the first embodiment.

Additional Description of Embodiments

In the above embodiments, the shapes and structures of the seat brackets 52, the airbag brackets 68, the front retainer 82, the rear retainer 96, etc. are illustrated by way of example only, and can be changed as necessary.

In the above embodiments, in each front fixing portion 90 of the bag support 50, the stud bolt 92 for the inflator 36 is also used to fix the seat bracket 52 and the airbag bracket 68 together. However, the disclosure is not limited to this. For example, the front fixing portions 90 may have a fixing structure using a clip similar to the clip 132 in the fourth embodiment. The same applies to the rear fixing portions 102. Alternatively, the front fixing portions 90 may have a retaining structure similar to the fixing portion 63 in the first embodiment.

In the above embodiments, the seat brackets 52 are welded to the front pipe frame 20. However, the disclosure is not limited to this. The structure for fixing the seat brackets 52 to the front pipe frame 20 may be a fastening structure using bolts etc. and can be changed as necessary.

In the above embodiments, the bag support 50 includes the seat brackets 52 and the airbag brackets 68. However, the disclosure is not limited to this. The bag support 50 may be of any type as long as the bag support 50 is fixed to the front pipe frame 20 and the cushion airbag 34 is fixed to the bag support 50 at a position rearward of the front pipe frame 20. The bag support 50 is made of a strong, rigid material.

The disclosure can be carried out in various modified forms without departing from the spirit and scope of the disclosure. It should be understood that the scope of the disclosure is not limited to the above embodiments.

What is claimed is:

1. A vehicle seat, comprising:
a seat cushion in which a front panel extends between front parts of right and left side frames and a front rod extends between the front parts of the right and left side frames at a position rearward of the front panel in a longitudinal direction of a vehicle;
a cushion airbag device mounted in a front part of the seat cushion and configured to inflate and deploy a cushion airbag when a frontal collision of the vehicle occurs; and
a bag support fixed to the front rod, the cushion airbag being fixed to the bag support at a position rearward of the front rod in the longitudinal direction of the vehicle, the bag support includes a seat bracket and an airbag bracket, the seat bracket is fixed to the front rod, the airbag bracket is disposed above the seat bracket in a vertical direction of the vehicle, the cushion airbag being fixed to the airbag bracket at a position rearward of the front rod in the longitudinal direction of the vehicle, and the airbag bracket and the seat bracket are fixed to each other in a fixing portion located rearward of the front rod in the longitudinal direction of the vehicle,
wherein in the fixing portion, a stopper portion provided on the airbag bracket is retained by a retaining portion provided in the seat bracket.

2. The vehicle seat according to claim 1, wherein the stopper portion is configured to be retained by the retaining portion by sliding the stopper portion toward a front of the vehicle into the retaining portion.

3. The vehicle seat according to claim 1, wherein the stopper portion is configured to be retained by the retaining portion by sliding the stopper portion into the retaining portion in a lateral direction of the vehicle.

4. The vehicle seat according to claim 1, wherein the seat bracket is welded to the front rod.

5. The vehicle seat according to claim 1, wherein the airbag bracket and the seat bracket are fixed to each other in a front fixing portion located forward of the front rod in the longitudinal direction of the vehicle.

6. The vehicle seat according to claim 1, wherein the airbag bracket and the seat bracket are fixed to each other in a rear fixing portion located rearward of the fixing portion in the longitudinal direction of the vehicle.

7. The vehicle seat according to claim 3, wherein:
the cushion airbag device includes an inflator placed in the cushion airbag at a position forward of the front rod in the longitudinal direction of the vehicle; and
in the front fixing portion, a stud bolt for the inflator is passed through the airbag bracket and the seat bracket and is screwed into a nut.

8. The vehicle seat according to claim 1, wherein:
the stopper portion is a cutout portion in a side wall of the airbag bracket; and
the retaining portion is a protruding piece on a side wall of the seat bracket.

9. The vehicle seat according to claim 1, wherein:
the stopper portion is a stopper tab in an upper wall of the airbag bracket; and
the retaining portion is a retaining hole in an upper wall of the seat bracket.

10. The vehicle seat according to claim 1, wherein in the fixing portion, a nut is screwed on a bolt passed through the airbag bracket and the seat bracket.

11. The vehicle seat according to claim 1, wherein a clip passed through the airbag bracket and the seat bracket is provided in the fixing portion.

12. A vehicle seat, comprising:
a seat cushion in which a front panel extends between front parts of right and left side frames and a front rod extends between the front parts of the right and left side frames at a position rearward of the front panel in a longitudinal direction of a vehicle;
a cushion airbag device mounted in a front part of the seat cushion and configured to inflate and deploy a cushion airbag when a frontal collision of the vehicle occurs; and
a bag support fixed to the front rod, the cushion airbag being fixed to the bag support at a position rearward of the front rod in the longitudinal direction of the vehicle, the bag support includes a seat bracket and an airbag bracket, the seat bracket is fixed to the front rod, the airbag bracket is disposed above the seat bracket in a vertical direction of the vehicle, the cushion airbag being fixed to the airbag bracket at a position rearward of the front rod in the longitudinal direction of the vehicle, the airbag bracket and the seat bracket are fixed to each other in a fixing portion located rearward of the front rod in the longitudinal direction of the vehicle, and the airbag bracket and the seat bracket are fixed to each other in a rear fixing portion located rearward of the fixing portion in the longitudinal direction of the vehicle.

13. A vehicle seat, comprising:
a seat cushion in which a front panel extends between front parts of right and left side frames and a front rod extends between the front parts of the right and left side frames at a position rearward of the front panel in a longitudinal direction of a vehicle;
a cushion airbag device mounted in a front part of the seat cushion and configured to inflate and deploy a cushion airbag when a frontal collision of the vehicle occurs; and
a bag support fixed to the front rod, the cushion airbag being fixed to the bag support at a position rearward of the front rod in the longitudinal direction of the vehicle,
wherein the cushion airbag device is formed in a wedge shape as viewed in a lateral direction, and a vertical dimension of the cushion airbag device decreases rearwardly in the longitudinal direction of the vehicle, and the cushion airbag device is disposed at in such an attitude that the cushion airbag device is tilted downward in the longitudinal direction with a rear portion of the cushion airbag device being arranged at a lower position than a position of a front portion of the cushion airbag device.

* * * * *